United States Patent [19]

Bement

[11] 4,106,687

[45] Aug. 15, 1978

[54] TOTALLY CONFINED EXPLOSIVE WELDING

[75] Inventor: Laurence J. Bement, Newport News, Va.

[73] Assignee: The United States of America as represented by the Administrator of the National Aeronautics and Space Administration, Washington, D.C.

[21] Appl. No.: 395,493

[22] Filed: Sep. 10, 1973

Related U.S. Application Data

[62] Division of Ser. No. 289,048, Sep. 14, 1972, Pat. No. 3,797,098.

[51] Int. Cl.² ............................................. B23K 21/00
[52] U.S. Cl. .................................... 228/2.5; 29/421 E; 228/107
[58] Field of Search ................. 29/421 E, 486, 470.1, 29/497.5; 72/56; 228/3, 2.5, 3.1, 106, 107, 237, 108

[56] References Cited

U.S. PATENT DOCUMENTS

| 2,038,304 | 4/1936 | Middler ................................. 72/56 |
| 3,175,618 | 3/1965 | Lang et al. ......................... 72/56 X |
| 3,316,627 | 5/1967 | Suzuki et al. ..................... 29/470.1 |
| 3,377,010 | 4/1968 | Suzuki et al. ............................ 228/3 |
| 3,409,969 | 11/1968 | Simons et al. ...................... 29/157.3 |
| 3,413,833 | 12/1968 | Lieberman et al. .................... 72/56 |
| 3,590,877 | 7/1971 | Leopold ................................. 138/89 |
| 3,661,004 | 5/1972 | Lee et al. ................................. 72/56 |
| 3,724,062 | 3/1973 | Contrell et al. ..................... 228/3 X |
| 3,780,927 | 12/1973 | Kudrnori et al. ............... 29/420.1 X |
| 3,790,060 | 2/1974 | Feiss ....................................... 228/3 |

Primary Examiner—Francis S. Husar
Assistant Examiner—Gus T. Hampilos
Attorney, Agent, or Firm—Howard J. Osborn; John R. Manning

[57] ABSTRACT

A simple means for eliminating the noise and debris of explosive welding techniques by totally enclosing and applying the explosive pressure through the wall of the enclosure.

3 Claims, 4 Drawing Figures

TOTALLY CONFINED EXPLOSIVE WELDING

ORIGIN OF THE INVENTION

The invention described herein was made by an employee of the U.S. Government and may be manufactured and used by or for the Government for Governmental purposes without the payment of any royalties thereon or therefor.

This is a division of application Ser. No. 289,048, filed 9/14/72, now U.S. Pat. No. 3,797,098.

BACKGROUND OF THE INVENTION

This invention relates generally to explosive welding techniques and specifically to a means of limiting the noise and products of the explosive process.

Explosive welding as presently practiced is an efficient method for bonding materials which are difficult to weld by more conventional means. It is particularly useful for thin materials which might suffer damage or change properties due to heat; for specific materials such as titanium or aluminum which have unique properties requiring a high degree of skill for conventional welds; and for large structures which require complex and expensive equipment to obtain uniform welds by conventional means.

Explosive welding is a comparatively simple procedure with which such materials may be bonded by relatively unskilled personnel. In such a technique the parts to be welded are spaced slightly apart by separators, jigs, or dimples and explosive is attached to one of the parts directly opposite the proposed bond area. The other part to be welded is rigidly supported on an anvil or table. Upon detonation of the explosive the parts to be welded are driven together with such force that they are metallurgically bonded. It is generally accepted that as the collision occurs remaining surface contaminants are stripped away, providing virgin metal for the metallurgical bond.

The tooling requirements for such an operation are very minimal. Satisfactory seam welds can be secured with only a cord-like preformed explosive, aluminum spacers, clamps, masking tape and a commercially available blasting cap detonator. The fabrication designer is able to specify all these items so that an unskilled person can perform the operation with reasonable certainty that a leak-proof bond will result. Because of the minimal tooling, low cost, and ability to weld aluminum and titanium, application of the explosive welding technique is anticipated in the aircraft industry and in extra-terrestrial applications. It is viewed as particularly applicable to the fabrication of space stations in orbit. Despite its advantages and the fact that the technique has been under development for almost twenty years, it has seen relatively little industrial use.

This may be because of the psychological effects of the noise and scattering of debris from the explosion. While such phenomena are relatively minor when a small amount of explosive is used, they do present some safety hazard and create a reluctance to the use of this otherwise valuable technique. This same explosive debris presents another problem in some applications. In high vacuum, space and other applications which require close control of potential contaminants, the explosive welding technique presents the problem of scattering debris into areas where it causes undesirable contamination. The present invention solves these problems without adding significantly to the complexity or cost of the basic technique.

SUMMARY OF THE INVENTION

The present invention is a method and associated apparatus for confining the undesirable byproducts and limiting the noise of explosive welding, the use of which has been limited because of such phenomena. The apparatus is comprised of a simple enclosure into which the explosive is placed and within which the explosion occurs. Due to the shape of the enclosure, the placement of the explosive within it, and the manner in which the enclosure is placed upon the material to be welded, the force of the explosion is transmitted to the proposed bond area. Moreover, since the explosion is totally confined within the enclosure the noise of the explosion is reduced dramatically and no debris is strewn about to contaminate the weld area or create personnel hazards. In one example of a seam bonded by explosive welding, flattened steel tubing is used as an enclosure. This is attached to the weld material by the use of masking tape, just as the explosive itself is attached in unconfined explosive welding. The preformed explosive is slipped into the tubing along with a strip of silicone rubber which holds the explosive against the flattened side of the tubing which is adjacent to the proposed weld area. The explosion is initiated electrically by a commercially available detonator which threads into a fitting welded to one end of the tubing. The noise generated is no more than the rattle of metal, whereas an unconfined explosion creates noise comparable to that of a very close shotgun firing. The residue from unconfined explosive welding contains carbon, portions of the explosive sheathing material, and masking tape. Such residue is completely contained when the confined technique is used so that the use of such a bonding method becomes practical even in the restricted environment of a space station.

The method of confined explosive bonding retains all the benefits of the original technique. It is capable of welding materials that are normally extremely difficult; it can weld very thin materials such as those used on aircraft and spacecraft; it requires very little tooling so that it may be used in remote installations or on large structures; and its simplicity allows performance by unskilled labor. Because of these original benefits, the totally confined explosive welding method eliminates the major remaining problems involved in the process, those of noise and debris, with no significant sacrifice of simplicity.

DETAILED DESCRIPTION OF THE INVENTION

Figure 1:
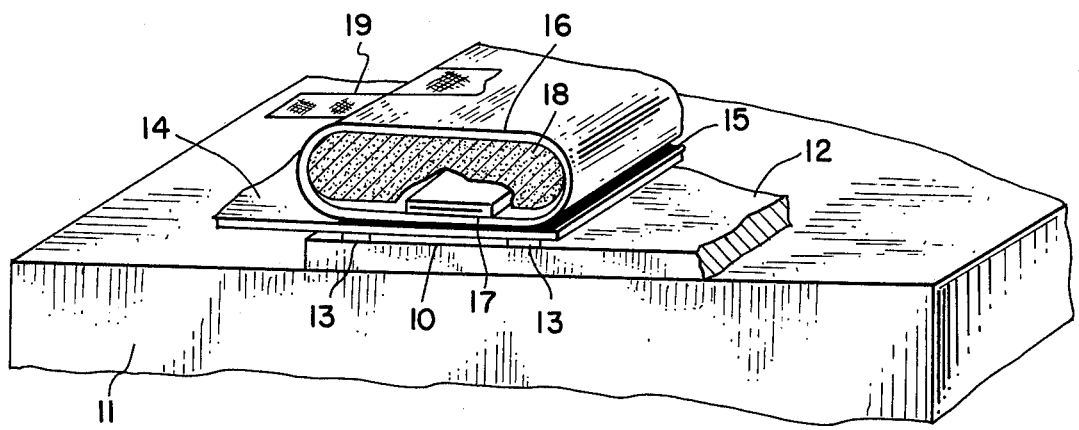
FIG. 1 is a perspective view of the apparatus for confining the explosive showing a typical cross section.
Figure 2:
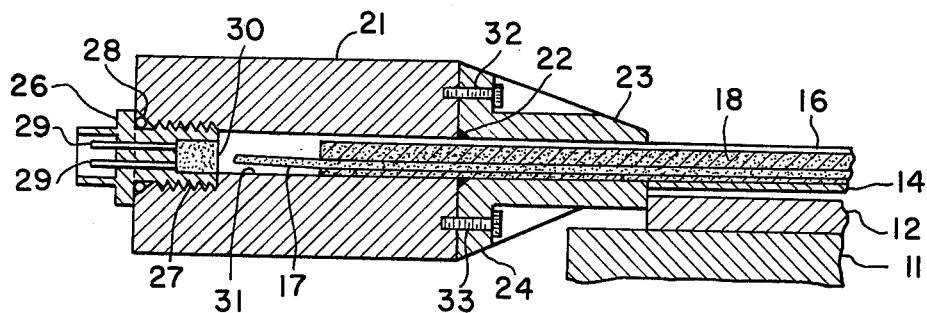
FIG. 2 is an axial cross-sectional view of the detonator adapter assembly.

The embodiment of the invention selected for illustration as shown in FIGS. 1 and 2 is one used for seam welding. FIG. 1 shows a typical cross-sectional view perpendicular to the planes of sheet materials 12 and 14 to be welded and to the centerline of the proposed bond area 10 at which they will be joined. Upper sheet 14 is 0.040 inch thick aluminum; and while lower sheet 12 is 0.25 inch aluminum in this example, it should be understood that these materials may be either the same or different thicknesses. Lower sheet 12 is placed upon anvil 11 which supports the work, furnishes reactive force during the explosion, and absorbs excess shock waves. Separators 13 made of aluminum 0.010 inch thick, are placed on either side of proposed bond area 10 and are located with sufficient clearance so that they will not interfere with the subsequent bonding. Separation is required in the explosive welding process so that a velocity may be imparted to one or both of the pieces to be welded. This velocity is a basic requirement for the explosive welding process so that the collision between the workpieces strips the mating surfaces clean and metallurgically bonds them together. In the arrangement shown in FIG. 1, the velocity is imparted to upper sheet material 14 by the force generated by the detonation of explosive 17. This force is transmitted through the wall of the steel tubing of infrangible enclosure 16 and the silicone grease 15 which is placed between the lower flattened side of tubing 16 and the upper surface of the material to be bonded 14. Grease 15 is used to assure that no voids exist between tubing 16 and workpiece 14 and that the explosive pressure is efficiently transmitted to the material to be welded. Explosive 17 is completely contained within steel tubing 16 and its appropriate end fittings. This containment prevents any products of the explosion from reaching the surrounding environment and virtually eliminates the noise of the explosion. Infrangible enclosure 16 used in the arrangement shown in FIG. 1, is a steel tubing and may be formed from type 347 alloy. It is .85 inch on the longest dimension of its cross section and is 0.30 inch high. The wall thickness is 0.030 inch and the dimension of the flat surface is 0.5 inch. Infrangible enclosure 16 is attached to upper sheet 14 by the use of strips 19 of conventional masking tape.

Explosive 17 used in the specific embodiment shown is a linear ribbon constructed of lead sheathed RDX explosive. It is available with explosive loads of 7 to 25 grains per foot but in the specific example 15 grains per foot is used. Its size is 0.025 inch thick by 0.315 inch wide overall. It may safely be cut to length with a scissors. The use of an enclosure to contain the byproducts of the explosion and reduce noise is in no way limited to either the specific explosive or the specific enclosure described herein. However, it should be understood that the enclosure must be selected to contain the explosion without rupture while the explosive should be selected with consideration of materials and thicknesses to be welded.

The silicone filler strip 18 is slipped into steel tubing 16 along the explosive 17. Together they are sized to form a snug but not tight fit within tubing 16. Filler strip 18 holds explosive 17 in contact with the flattened side of steel tubing 16 during preparation. When the explosion occurs filler strip 18 attenuates and diffuses that force which is directed away from weld area 10 so that no rupture occurs in the topside of tubing 16. The silicone rubber filler strip 18 also contributes to the reduction of the noise from the operation.

Figure 3:
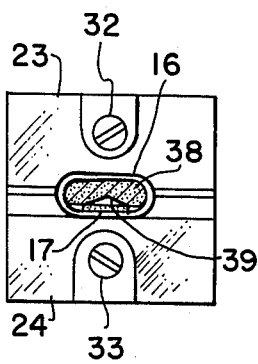
FIG. 3 is an end view of the detonator adapter assembly.

FIGS. 2 and 3 illustrate the detonator adapter assembly which is used in conjunction with the configuration of FIG. 1 to accomplish total enclosure of the explosive. Because of the shock pressures generated by the explosion such fittings must be structurally strong and contain pressure seals at all joints. This is accomplished in the illustrated assembly by attaching steel enclosure tube 16 to steel end housing 21 at weld joint 22 by welding prior to setting up the explosive welding operation. The commercially available detonator cartridge 26 is screwed into end housing 21 by means of threads 27 and tightened against O-ring 28 to complete the pressure seal to the interior of the explosive enclosure extension 31 drilled into the center of housing 21.

The aluminum restraining adapters 23 and 24 are added to the assembly to prevent the explosive shock from fracturing enclosure tube 16 at weld joint 22. The explosion is initiated by supplying current to electrical pins 29 which detonates charge 30, in turn detonating explosive 17. The explosive detonates along its length at a finite velocity of the order of 26,000 ft/sec. As this detonation wave passes weld joint 22 between end housing 21 and tubing 16 the stress created by the shock wave on the unsupported tubing would be such as to rupture the tubing at the weld. Upper restraining adapter 23 is attached to end housing 21 by bolt 32, while lower restraining adapter 24 is attached to end housing 21 by bolt 33. Together the restraining adapters 23 and 24 completely surround tubing 16 and support it in all directions. This support decreases as the distance from the end housing increases because of the tapered construction of the restraining adapters. Upper restraining adapter 23 provides restraint which at end housing 21 approaches the same degree of restraint afforded by the end housing while at the other end the adapter is tapered to approach the strength of only the unsupported tubing 16. Lower restraining adapter 24 furnishes restraint approaching that of the end housing at one end, but is tapered such that at the other end it approximates the restraint provided to tubing 16 by the work piece 14. The surface of the tubing 16 against which explosive 17 acts, in this example the lower surface, must be supported in some manner for the entire length of the explosive in order to prevent a discontinuity at the work piece which would accentuate the stress on the tubing and cause rupture. The upper surface of the tubing does not require such backing since the shock from the explosive is damped by the silicone rubber filler material 18 and there is no backing material along the total tubing length.

Figure 4:
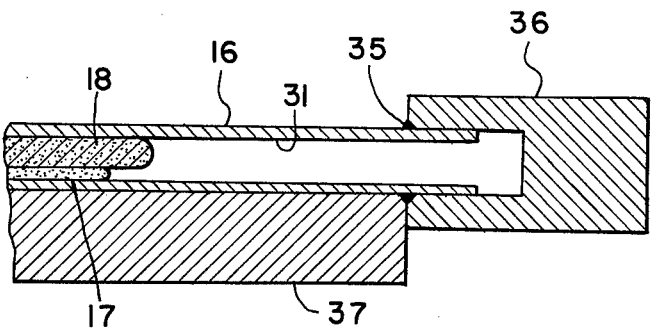
FIG. 4 is an axial cross-sectional view of the closed end fitting.

FIG. 4 shows the closed end fitting used at the end of the tubing opposite from the detonator. It comprises a simple end cap 36 drilled to fit outside tubing 16. The tubing is inserted into cap 36 and welded at 35. Tubing 16 rests on support 37 for its length not supported by the weld pieces to meet the requirements for shock restraint. However, when tubing 16 is made long enough in the section that contains no explosive 17, the shock wave is reduced to a level that requires no support. Such a modification is valuable where the welding is done in confined quarters and it is desirable to place the end fitting elsewhere.

While the benefits of explosive welding are most apparent in longseam welding, neither the prior technique nor the invention described herein is limited to such a configuration. Any operation which previously used explosive welding can benefit from the enclosing of the explosive so as to limit the noise and debris. In spot-welding, as another example, small containers can be constructed which enclose the charge used for each spot.

Another variation of the technique prescribed by this invention is the use of two enclosures to contain the dual explosive charge used when a second charge is substituted for anvil 11 in the prior example. The confinement technique is also effective in its simplest form when no silicone grease as shown by 15 in FIG. 1 is used. In such an option only a slight loss of efficiency of transmission of explosive force may be experienced if the surfaces of tubing 16 and workpiece 14 do not mate exactly. The silicone rubber filler material 18 provides for other variations. In one case, it may be entirely removed and the absence of attenuation of the explosive force counteracted by strengthening the enclosure, shaping the enclosure, or minimizing the charge of explosive. The filler material may also be shaped and made of a material such that it will actually reflect the force back in the direction of the bond thereby increasing the force available from a given charge. Such a variation is shown in FIG. 3 in which filler material 38 has a triangular undercut 39. The enclosure may likewise be constructed so as to deflect the forces back to the work area to accomplish a similar increase in effective force.

It is to be understood that the forms of the invention herein shown are merely preferred embodiments. Various changes may be made in shape, size and the arrangement of parts; equivalent means may be substituted for those illustrated and described; and certain features may be used independently from other features without departing from the spirit and scope of the invention as defined in the following claims. For example, the enclosure shown is constructed from flattened steel tubing. Other shapes and materials may be used where the parts to be welded and the explosive used make them more effective or economical.

What is claimed as new and desired to be secured by Letters Patent of the United States is:

1. An apparatus for limiting the disturbing noise and hazardous debris of an explosive bonding procedure while transmitting the explosive pressure to the area to be bonded comprising:

infrangible enclosure means removably attached to one of the members to be bonded at the point directly opposite the bond area;

explosive means completely confined inside the infrangible enclosure means at a point of close proximity to the member to be bonded;

detonating means attached to said explosive means to initiate the explosive within the infrangible enclosure means; and the balance of the enclosure not occupied by explosive filled with a shaped material which directs the explosive pressure toward the bond area.

2. An apparatus for limiting the disturbing noise and hazardous debris of an explosive bonding procedure while transmitting the explosive pressure to the area to be bonded comprising:

infrangible enclosure means removably attached to one of the members to be bonded at the point directly opposite the bond area;

explosive means completely confined inside the enclosure means at a point of close proximity to the member to be bonded;

detonating means attached to said explosive means to initiate the explosive within the enclosure means;

the balance of the infrangible enclosure means not occupied by the explosive being filled with a material which attenuates and diffuses the explosive pressure not directed toward the bond area, said material also serving to position and retain the explosive;

the infrangible enclosure means being flattened steel tubing with end fittings which seal off the ends of the tubing;

the explosive means being lead-sheathed RDX explosive;

the detonating means being an electrically operated detonator cartridge which screws into threads in an end fitting; and the filler material being silicone rubber.

3. An apparatus for limiting the disturbing noise and hazardous debris of an explosive bonding procedure while transmitting the explosive pressure to the area to be bonding comprising:

infrangible enclosure means removably attached to one of the members to be bonded at the point directly opposite the bond area;

explosive means completely confined inside the enclosure means at a point of close proximity to the member to be bonded;

detonating means attached to said explosive means to initiate the explosive within the infrangible enclosure means;

a detonator adapter which accommodates commercially available detonators by variation in its structural strength as a function of its length from the end of the explosive enclosure controls the expansion of the enclosure by the explosive force such that the enclosure at no point experiences a discontinuity in expansion which causes rupture;

said detonator adapter having an end housing with a central aperature adapted to receive a portion of the infrangible explosive enclosure to form an extension to and close the infrangible explosive enclosure, said housing being connected to the explosive enclosure;

said detonator adapter also having an upper adapter fastened to said end housing at the end opposite said detonator, shaped so that it fits tightly against said infrangible explosive enclosure and furnishes a varying support to said infrangible enclosure, such support decreasing with distance from the end housing; and said detonator adapter further having a lower adapter fastened to said end housing at the end opposite the detonator shaped so that it fits tightly against said infrangible explosive enclosure and said upper adapter to form a variable strength support member on all sides of the infrangible explosive enclosure.

* * * * *